UNITED STATES PATENT OFFICE.

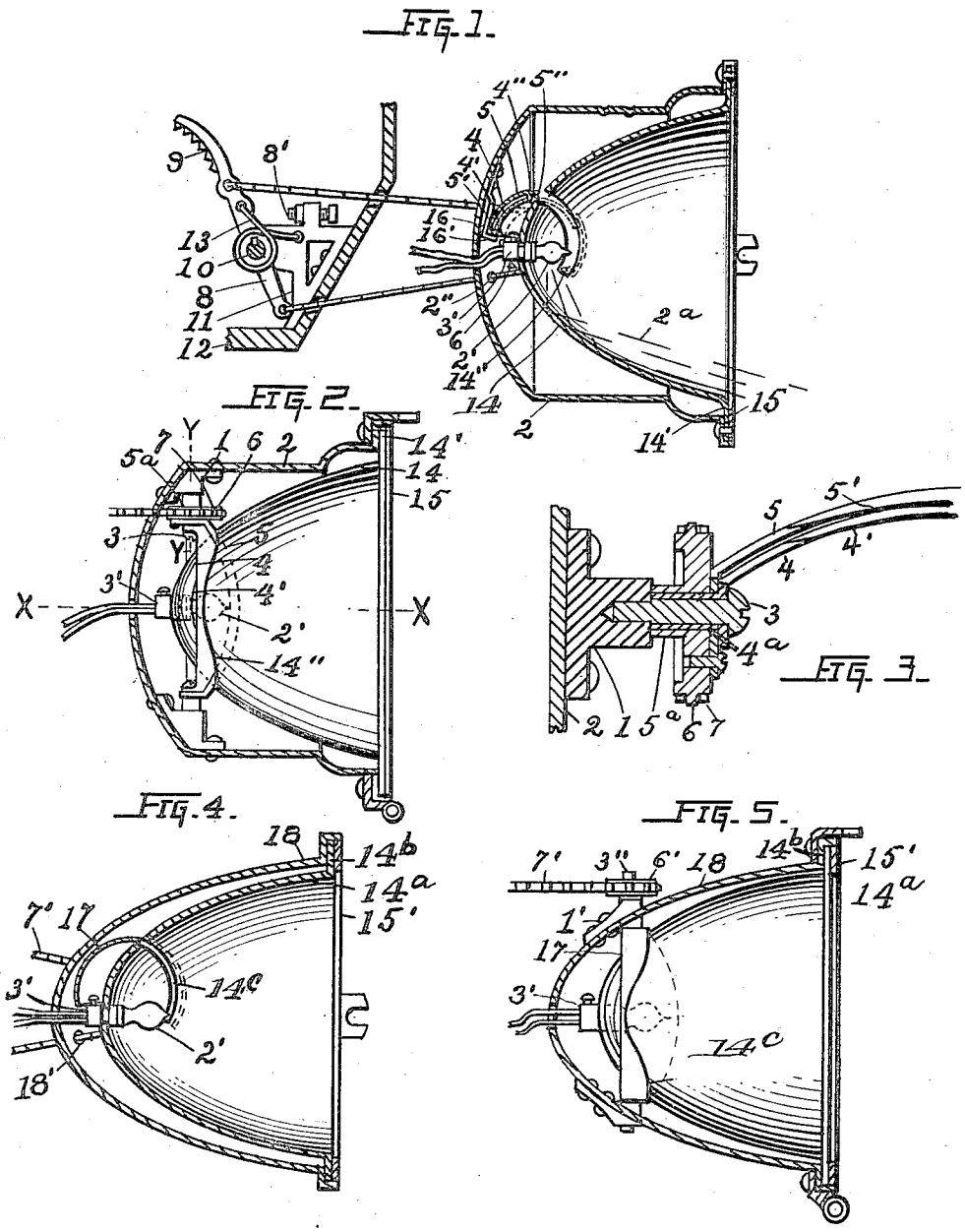

THOMAS SHAFFER, OF ST. JOSEPH, MISSOURI.

AUTOMOBILE LAMP REFLECTOR AND SHADE COMBINED.

1,123,939. Specification of Letters Patent. Patented Jan. 5, 1915.

Application filed June 6, 1914. Serial No. 843,517.

*To all whom it may concern:*

Be it known that I, THOMAS SHAFFER, a citizen of the United States, residing at St. Joseph, in the county of Buchanan and State of Missouri, have invented certain new and useful Improvements in Automobile Lamp Reflectors and Shades Combined, of which the following is a specification, reference being had therein to the accompanying drawing.

My invention relates to improvements in lamp reflectors and shades, combined, and are particularly applicable to that class of lamps that are used on automobiles and other vehicles.

The objects of my improvements are to construct a reflector of any desired shape, and particularly of parabolic form which shall be used in conjunction with a shade of similar character to the one set forth in my application, filed April 25, 1914, serially numbered 834,415, and also, to so improve said shade in form and construction, that the same shall be of minimum size and otherwise be adapted for use in conjunction with said reflector.

Further objects are to so combine the reflector and shade that they shall be especially adapted for use in shading and reflecting light made by lamps from which but a very small amount of heat is radiated, such as incandescent electric lamps and the like; and also to provide vent for such heated air as would otherwise be confined by the shade and accumulate heat around said lamp.

The prime object of the invention is to provide ready means, by the use of which, the driver of an automibile or other vehicle, while in his seat, can instantly shade his lamps to any desired extent and as quickly turn on their full flood of light.

I attain these objects by the mechanism illustrated in the accompanying drawing, in which:—

Figure 1 is a vertical section of the preferred form of the invention, on the line X—X, seen in Fig. 2, looking toward the left. Fig. 2 is a top plan of the preferred form of the reflector and shade, the upper portion of the lamp body being broken away to avoid obscurity. Fig. 3 is an enlarged vertical section of one of the pivotal mountings and of the drive wheel, on the line Y—Y seen in Fig. 2. Figs. 4 and 5 similarly illustrate one of the various other forms in which the lamp shade and its mounting means may be constructed.

Referring to Figs. 1 and 3, my invention in its preferred form, comprises pivot blocks 1, secured on the inner surface of lamp body 2, containing an electric lamp 2', mounted therein. Said blocks each have a stud pivot 3 secured therein. The lower ends of shade section 4 have sleeves $4^e$ connected therewith, said sleeves being rotatably mounted on said pivots, while the lower ends of section 5 have sleeves $5^a$ connected therewith and rotatably mounted on sleeves $4^a$. One of the ends of section 5 is secured to sprocket wheel 6, which is mounted on one of the sleeves $5^a$. Said sprocket wheel is rotated by sprocket chain 7, the ends of which are secured to treadle 8, which has pedal 9 formed on its upper end. Said treadle is secured on treadle shaft 10, at a point on said treadle that is midway between said sprocket chain fastenings. Said treadle shaft is rotatably mounted in bearings 11, (but one of which is shown,) secured on the inclined portion of automobile floor 12. The front portion of sprocket chain 7 passes through apertures 2'' formed through the back of body 2. Shaft 10 is provided with recover spring 13, wound spirally thereon, one end of said spring being secured to one of said bearings, while its other end is connected with treadle 8, for recovering the pedal movement of said treadle. Said recover movement is limited by the lower portion of bearing 11, against which the lower end of treadle 8 is stopped. The pedal movement of said treadle is limited by the adjustable stop 8', which is screwed through an upwardly projecting portion of said bearing, for stopping forward movement of the upper portion of said treadle; thus providing adjusting means whereby the rotative movement of the shade section 5 is adjusted.

The front edge of reflector 14 has flange 14' formed thereon, said flange being secured on the front edge of body 2 by ring 15, secured thereon; while the rear end of said reflector has an aperture formed therethrough, in which lamp socket 3' is secured. Said reflector has slot 14'' formed through the upper half of the rear portion thereof; said slot being of such form and proportions as permits shade sections 5 and 4 to freely oscillate therethrough, and herein lies the vital element of improvement over the devices set forth in my previously designated application. Shade section 5 has the downwardly projecting flanges 5' and 5'' formed on the rear and front edges thereof, respectively. Shade section 4 has the downwardly projecting flange 4' formed on its rear edge, said flange being of such breadth that it is adapted to be stopped against the outer surface of reflector 14, and thereby limit forward movement of said section 4. Said section also has upwardly projecting flange 4'' formed on its front edge, which projects between flanges 5' and 5'', for movement of said section 4, as hereinafter described. Section stop 16 is secured on the inner surface of the back of lamp body 2. The free end portion of said stop is adapted to elastically press against the lower edge portion of section 5, while the L shaped extension 16' formed on the lower extremity of said stop, limits backward movement of section 4.

In operation, with the parts in the position seen in Fig. 1, the operator shades light 2ª in the following manner:—Said operator by the use of one foot, overcomes spring 13, and moves pedal 9 forward, toward the right, which by the sprocket connection, previously described, rotates shade section, clockwise, into slot 14'', until the movement is stopped by treadle stop 8'. While shade section 5 is thus moving, its flange 5' is thereby carried against flange 4'' and thereby moves section 4 in the same manner, until said movement is stopped, as previously described, with said sections in the position indicated by dotted lines, in front of lamp 2'. While in this position all of light 2ª is thereby shaded, except such small portion as passes between the lower edge of section 5 and the lower portion of lamp body 2. Said operator by controlling said movement of pedal 9, causes said lower edge of section 5 to stop at any desired point of its movement; thus instantly shading said light to any desired extent. Said operator thus holds pedal 9, so long as the shading of said light is desired, after which he removes his foot from said pedal, upon which spring 13 recovers said movement of treadle 8 and the therewith connected parts including said shade sections. During the latter portion of the recover movement of section 5, its flange 5'' is carried against flange 4'', and thereby moves shade section 4 toward the left for recover movement thereof, until both of said sections again assume the position shown. The described operations are repeated from time to time, as occasion may require that said light should thus be shaded, such as to avoid the temporary blinding of other persons, by the same, and the scaring of teams of horses and the like. When such shading is done, it will be understood that the unshaded portion of said light, shines downward and forward, at such angle to the surface of the ground, (not shown,) as will provide sufficient light on said ground at all times, to enable said operator to see the same, a short distance ahead of the described shaded light.

While I have shown and described the shade sections 5 and 4 in the foregoing manner; and their pivotal mounting means, and drive wheel as being inside of lamp body 2, it is evident, that where space will permit, but one section of said shade could be made of sufficient extension to shade said lamp 2' and that where the form of said lamp body demands the same, said pivotal mountings and drive wheel could be placed on the outside of said lamp body, without departing from the spirit of my invention; all of which I reserve the right to do. Such extended shade section and different arrangement of parts are shown in Figs. 4 and 5, in which:—Shade section 17 is of such proportions that it properly shades lamp 2', and is used in such lamp body 18 as affords ample space therefor. Where but scant space is found between the sides of said body and reflector 14, bearings 1' are secured on the outer surface of body 18. Shade shafts 3'' are secured to the ends of shade section 17, and are rotatably mounted in said bearings, while sprocket wheel 6' is secured on the outer end of one of said shade shafts, (as seen in Fig. 5,) and is rotated by sprocket chain 7'. Said chain is operated by the pedal mechanism seen in Fig. 1, and previously described. Shade section 17 under ordinary conditions does not require any flanges on its edges as are used on sections 5 and 4, nor is a shade stop needed, such as is seen at 16, in Fig. 1; but where conditions require such the same may be used.

While I have shown the parts of the shade, the pivotal mounting means for same, and the slotted reflector, in the foregoing manner, it is evident that the same could be of various other forms and proportions for use in variously shaded lamp bodies, and for use in conjunction with reflectors of various forms, without departing from the spirit of my invention, all of which I reserve the right to do.

Having fully described my invention, what I claim as original and new, and desire to secure by Letters Patent, is:—

1. In a reflector and shade, combined; a reflector having a slot formed through the rear portion thereof, said reflector being adapted to have a lamp mounted in said rear portion; and an oscillatably mounted shade adapted to be oscillated through said slot for shading said lamp.

2. In a reflector and shade combined; a reflector having a slot formed through the rear portion thereof; a lamp body for holding said reflector; a lamp mounted in said rear portion of said reflector; a shade adapted to be oscillated through said slot into said reflector and in front of said lamp for shading the latter; shade mounting means secured on said lamp body whereby said shade is oscillatably supported; and oscillating means whereby said shade is oscillated.

3. A reflector for reflecting light from a lamp, said reflector being adapted to have said lamp mounted in the rear end portion thereof and having a slot formed therethrough adapted to have a shade passed through said slot into said reflector and in front of said lamp for shading the latter.

In testimony whereof I affix my signature in the presence of two witnesses.

THOMAS SHAFFER.

Witnesses:
ELLIOTT MARSHALL,
FRANK M. LEMMON.